Oct. 19, 1971 TAMIHIKO SOEJIMA ET AL 3,613,449

IMPACT FLOW METER FOR POWDERY AND GRANULAR MATERIALS

Filed Aug. 28, 1968

INVENTOR
TAMIHIKO SOEJIMA
HIROSHI KAJIURA
KINNOSUKE WATANABE
BY Stenberg & Blake
attys United States Patent Office 3,613,449
Patented Oct. 19, 1971

3,613,449
IMPACT FLOW METER FOR POWDERY AND
GRANULAR MATERIALS
Tamihiko Soejima, 20–2 Nanan-cho, Showa-ku, Nagoya-shi, Japan; and Hiroshi Kajiura, 1–5, 2-chome, Higa-shinakano, Nakano-ku; and Kinnosuke Watanabe, 22–8, 3-chome, Nishiochiai, Shinjuku-ku, both of Tokyo, Japan
Filed Aug. 28, 1968, Ser. No. 755,982
Int. Cl. G01f 1/00
U.S. Cl. 73—228      7 Claims

ABSTRACT OF THE DISCLOSURE

An impact flow meter for powdery and granular materials comprising an impact-receptive detecting plate for receiving a powdery or granular material dropped from a predetermined height and a wiper for keeping the plate clean and preventing deposition of the dropping material, said detecting plate and said wiper being arranged close to each other and made symmetrically operable with respect to each other.

---

This invention relates principally to improvements in impact-receptive detecting plate of impact flow meter for powdery and granular materials, and the invention has for its main object complete elimination of error in measurement due to deposition of dropping particles of powdery or granular material on the impact-receptive detecting plate.

Figure 1:
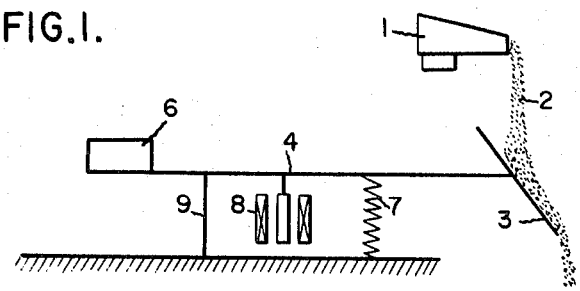

In the accompanying drawings: FIG. 1 is a view explanatory in general of an impact flow meter for powdery and granular materials; and FIGS. 2 to 6 are views illustrating different embodiments of the present invention, FIG. 2 being a diagrammatic plan view of an embodiment of the invention, FIG. 3 a side view of the essential part of the above embodiment, FIG. 4 a sectional view of the essential part of a second embodiment, FIG. 5 a diagrammatic perspective view of a third embodiment, and FIG. 6 a view explanatory of a fourth embodiment.

Generally "impact flow meters for powdery and granular materials" is a generic term for the instruments for measuring and indicating the instantaneous flow rate of a powdery or granular material through the determination of a vertical impact load which results from dropping of the subject material from a certain height.

One example of such instruments is shown in FIG. 1. In the flow meter of this type, a powdery or granular material 2 is allowed to drop from a feed means onto a chute or impact-receptive detecting plate 3 thereby producing an impact load proportional to the flow rate. The load is balanced with the reaction force of a spring 7 through a beam 4. Of course this beam is equipped with a weight 6 and a supporter 9 so that, in the absence of any impact load, the beam can be kept in a horizontal position with the aid of the supporter 9. When the beam is displaced by the vertical impact to which the impact-receptive detecting plate 3 is subjected, the displacement is converted into an electrical value by a differential transformer 8 and is indicated as such. Thus, the differential transformer forms a means operatively connected with the detecting plate for measuring the flow rate. It is naturally important that the powdery or granular material be dropped always from a predetermined height. In addition, various other requirements must be met adequately for a high degree of accuracy in the measurement.

Above all, it is a requirement of particular importance that any deposition of dropping particles on the impact-receptive detecting plate should be avoided. Otherwise even a small deposit of powder or granules on the receiving plate would produce an error in the reading of the instrument as if by an increase in the flow rate. Once deposited on the plate and left unremoved, the bit of material will stick to the plate and will snowball, thus resulting in an accordingly increased error in the indication of measured value.

With this in view, the present invention is directed to complete prevention of the deposition of dropping particles on the impact-receptive detecting plate of the instrument for determining the flow rate of solids.

This invention in essence pertains to a flow meter comprising an impact-receptive detecting plate for receiving a powdery or granular material dropped from a predetermined height and a wiper for keeping the plate clean and preventing deposition of the dropping material, said detecting plate and said wiper being arranged close to each other and made symmetrically operable with respect to each other.

Figure 2:
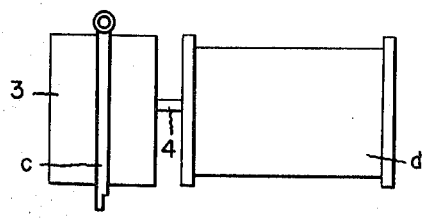
Figure 3:
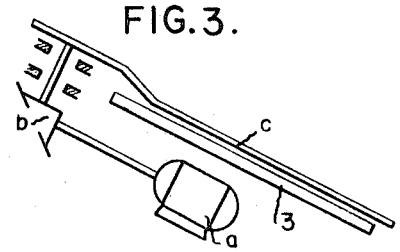

Description will now be made of the present invention in more detail hereunder with reference to the accompanying drawings showing four embodiments thereof. Referring specifically to FIG. 2 which illustrates a first embodiment of the invention, the impact plate is equipped with a wiper in such way that the wiper can be operated over the plate surface or the wiper is kept stationary while the plate is turned or moved reciprocatingly.

To be more specific, this embodiment prevents the deposition of powder or granules as the revolving force of a motor $a$ fixed to the rear side of the detecting plate 3 is transmitted by gearing $b$ to move the wiper $c$ frictionally over the surface of the impact-receptive detecting plate 3. If, in this embodiment, the gearing $b$ is replaced by a crank mechanism, the wiper will do reciprocate motions. Conversely if the impact-receptive detecting plate 3 is turned or moved reciprocatingly, the wiper $c$ may be employed in a stationary state. An additional wiper may be provided on the rear side of the impact plate to rub and clean both sides of the plate simultaneously.

Figure 4:
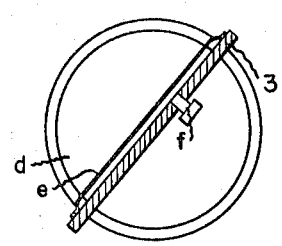

In a second embodiment shown in FIG. 4, the impact-receptive detecting plate is covered with an elastic membrane on the top surface and is formed with a port for supplying compressed air from the rear side of the plate.

Powdery or granular material fed from feed means (as designated at 1 in FIG. 1) drops onto the impact-receptive detecting plate 3 of this embodiment so that the impact load thereby detected can be measured by the flow meter $d$ which forms a means operatively connected to the detecting plate for measuring the flow rate. Since a thin membrane $e$ of an elastic material such as rubber is stretched over the surface of the impact-receptive detecting plate 3, compressed air supplied through the port $f$ vibrates the membrane thereby preventing the powdery or granular material from depositing thereon. Repetition of the supply of compressed air at suitable intervals of time can therefore completely eliminate the possibility of the dropping particles depositing on the impact-receptive detecting plate.

Figure 5:
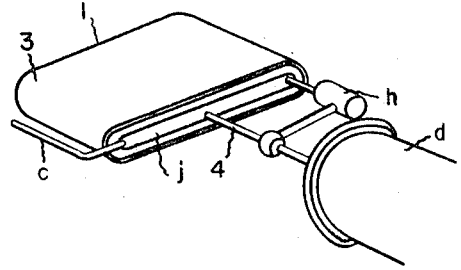

In a third embodiment shown in FIG. 5, the impact-receptive detecting plate is formed of an endless belt adapted to be driven by an electric motor, a part of the belt being disposed close to a wiper.

In this embodiment, a motor $h$ is secured to the beam 4 of the means for measuring the flow rate formed by the flow meter $d$ and drives an endless belt $i$, while a wiper $c$ located near a rotatable wheel $j$ provided below the belt wipes off the deposited powder or granules from the surface of the endless belt $i$.

Thus, the powdery or granular material dropped on the surface of the endless belt $i$ which serves as an impact-receptive detecting plate mostly flows out by itself but a part may deposit on the belt. The deposited particles are forcibly wiped off by the wiper c from the belt surface, and therefore the belt is always kept clean and ensures highly accurate measurement.

Figure 6:
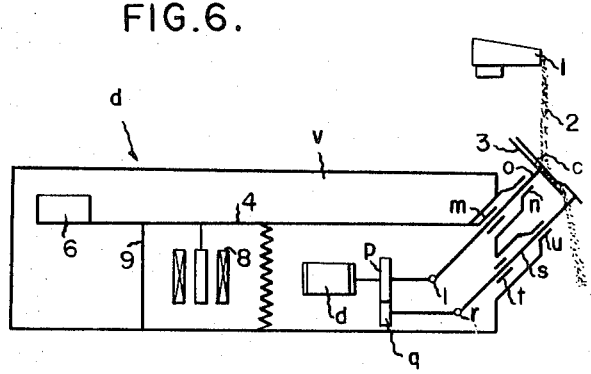

In a fourth and last embodiment shown in FIG. 6, an impact-receptive detecting plate and a wiper positioned close to the plate are moved at regular intervals of time alternately and symmetrically with each other. It is alternatively possible to fix the wiper immovably and operate only the impact-receptive detecting plate continuously in a predetermined direction.

In the embodiment shown, the impact-receptive detecting plate 3 is caused to reciprocate sidewise at predetermined intervals of time by a crank mechanism P coupled to a motor a, and a rod-shaped wiper c adjacent the impact-receptive detecting plate is also moved by a gearing q interlocked with the crank mechanism P at the same predetermined intervals as the impact plate, horizontally and alternately in the direction opposite to that of the plate. Journals m and t of the shafts c and s of the impact-receptive detecting plate 3 and the wiper c, respectively, are covered with sealing membranes n and u of a flexible material such as rubber.

With such construction, the powdery or granular material which naturally drops from a feed means 1 first hits against the impact-receptive detecting plate 3 but, because the impact plate and the wiper c positioned close there are moved always at regular intervals alternately and symmetrically with respect to each other, the dropping particles upon contact with the impact plate will be immediately shaken off without the chance of depositing on the plate surface. Thus, in proportion to the degree of impact given to the impact-receptive detecting plate, the flow rate is directly and accurately indicated on the instrument panel.

Moreover, the sealing membranes n and u prevent the dropping particles from gaining entrance into the measuring mechanism within the housing v which is thus totally enclosed excepting the stems of the impact-receptive detecting plate 3 and wiper c and maintain the movements of the impact plate and wiper themselves in normal conditions. This ensures added accuracy of the flow rate measurement.

While the embodiments enumerated hereinabove can all realize the object of the present invention, it is to be appreciated that numerous other embodiments are possible without departing from the spirit and scope of the invention.

Throughout the figures in the accompanying drawings, like reference numerals are used to denote the same or like parts.

What is claimed is:
1. In an impact flow meter for powdery and granular materials, an impact-receptive detecting plate for receiving a powdery or granular material dropped from a predetermined height, means operatively connected with said plate for measuring the flow rate, and a wiper for keeping the plate clean and preventing deposition of the dropping material, said detecting plate and said wiper being arranged close to each other and made symmetrically operable with respect to each other.

2. In an impact flow meter for powdery and granular materials as defined in claim 1 in which the impact plate and wiper form a pair of components one of which moves with respect to the other for bringing about the wiping action of said wiper for keeping said plate clean.

3. In an impact flow meter for powdery and granular materials as defined in claim 1 in which the impact-receptive detecting plate is covered with an elastic membrane on the top surface and is formed with a port for supplying compressed air from the rear side of the plate.

4. In an impact flow meter for powdery and granular materials as defined in claim 1 in which the impact-receptive detecting plate is formed of an endless belt adapted to be driven by an electric motor, a part of the belt being disposed close to the wiper.

5. In an impact flow meter for powdery and granular materials as defined in claim 1 in which the impact-receptive detecting plate and the wiper positioned close to the plate are moved at regular intervals of time alternately and symmetrically with each other.

6. In an impact flow meter for powdery and granular materials as defined in claim 1 and characterized in that the impact-receptive detecting plate and wiper are caused to reciprocate sidewise at predetermined intervals of time by a crank mechanism coupled to a motor, alternately and symmetrically with respect to each other in the directions opposite to each other.

7. In an impact flow meter for powdery and granular materials as defined in claim 1 characterized in that the journals for supporting the shafts of the impact-receptive detecting plate and wiper are wrapped with flexible sealing membranes.

References Cited

UNITED STATES PATENTS

| 3,173,583 | 3/1965 | Wahl | 222—199 |
| 3,217,943 | 11/1965 | Atwood | 222—189 |
| 3,269,181 | 8/1966 | Seay | 73—228 |
| 3,232,486 | 2/1966 | Ofner | 73—228 X |

JERRY W. MYRACLE, Primary Examiner